(12) United States Patent
Burns

(10) Patent No.: US 7,793,734 B2
(45) Date of Patent: Sep. 14, 2010

(54) REINFORCED POLYMER HORSESHOE

(76) Inventor: Curtis John Burns, 4529 Kensington Park Way, Lake Worth, FL (US) 33467

( * ) Notice: Subject to any disclaimer, the term of this patent is extended or adjusted under 35 U.S.C. 154(b) by 0 days.

(21) Appl. No.: 11/481,438

(22) Filed: Jul. 6, 2006

(65) Prior Publication Data
US 2007/0007017 A1    Jan. 11, 2007

Related U.S. Application Data

(60) Provisional application No. 60/697,414, filed on Jul. 8, 2005.

(51) Int. Cl.
*A01L 5/00* (2006.01)
*A01L 7/02* (2006.01)
(52) U.S. Cl. .............................. 168/4; 168/12
(58) Field of Classification Search ............. 168/12–14, 168/26, 28
See application file for complete search history.

(56) References Cited

U.S. PATENT DOCUMENTS

| | | | |
|---|---|---|---|
| 553,586 A * | 1/1896 | Kent | 168/4 |
| 676,894 A * | 6/1901 | Higgins | 168/13 |
| 760,924 A * | 5/1904 | Sandifer | 168/13 |
| 778,909 A * | 1/1905 | Simmons | 168/13 |
| 826,958 A * | 7/1906 | O'Brien | 168/13 |
| 826,959 A * | 7/1906 | O'Brien | 168/13 |
| 826,960 A * | 7/1906 | O'Brien | 168/13 |
| 3,285,346 A | 11/1966 | Jenny et al. | |
| 3,302,723 A | 2/1967 | Renkenberger et al. | |
| 3,519,079 A | 7/1970 | Bieber | |
| 3,603,402 A | 9/1971 | McDonnell | |
| 4,206,811 A | 6/1980 | Dallmer | |
| 4,496,002 A | 1/1985 | Jones et al. | |
| 4,513,824 A | 4/1985 | Ford | |
| 4,605,071 A | 8/1986 | McKibben | |
| 4,690,222 A * | 9/1987 | Cameron | 168/4 |
| 4,765,412 A | 8/1988 | Colonel et al. | |
| 4,889,188 A | 12/1989 | Anderson | |
| 4,892,150 A | 1/1990 | Thoman | |
| 4,972,909 A | 11/1990 | Rose | |
| 5,069,289 A | 12/1991 | Schaffer | |
| 5,137,092 A * | 8/1992 | Tuunanen | 168/4 |
| 5,165,481 A | 11/1992 | Duckett | |
| 5,172,766 A | 12/1992 | Adkins | |
| 5,320,184 A | 6/1994 | Noffsinger | |
| 5,348,098 A | 9/1994 | DiGiulio | |
| 5,692,569 A | 12/1997 | Constantino et al. | |
| 5,699,861 A | 12/1997 | Sigafoos | |
| 6,076,607 A | 6/2000 | Bergeleen | |
| 6,082,462 A | 7/2000 | Lyden | |
| 6,349,773 B1 | 2/2002 | Logan | |
| 6,497,293 B1 | 12/2002 | Miller | |
| 6,688,401 B2 | 2/2004 | Smith | |
| 6,843,323 B2 | 1/2005 | Poynton | |
| 6,868,914 B2 * | 3/2005 | Kolonia, Sr. | 168/14 |
| 6,915,859 B2 * | 7/2005 | Craig et al. | 168/4 |
| 2004/0035592 A1 * | 2/2004 | Kolonia, Sr. | 168/4 |
| 2005/0236165 A1 * | 10/2005 | Yates et al. | 168/4 |

FOREIGN PATENT DOCUMENTS

EP    0445056 A1 *   1/1991

OTHER PUBLICATIONS

Translation to EP0445056A1.*

* cited by examiner

*Primary Examiner*—Son T. Nguyen
(74) *Attorney, Agent, or Firm*—Alfred M. Walker; John F. Vodopia

(57) ABSTRACT

A flexile shoe to protect a horse's hoof, made of a moldable composition, and reinforced throughout with pliant metal, and further reinforced with a hard wear insert at the toe of the shoe. A method of molding the shoe, and of bonding the shoe to the hoof with adhesive.

14 Claims, 2 Drawing Sheets

REINFORCED POLYMER HORSESHOE

RELATED APPLICATION

This application claim the priority of U.S. Provisional Patent Application 60/697,414 filed Jul. 8, 2005.

FIELD OF THE INVENTION

The present invention relates to protective coverings for Equine hooves in particular a horseshoe made from non-metallic polymeric material, a method of attachment and a process of manufacture.

BACKGROUND OF THE INVENTION

Wild horses rarely suffer from lameness unless they are injured in some way. This is true mainly due to the fact that they are constantly on the move, run on uneven ground, stand in water and otherwise are exposed to environmental factors which wear away the hoof in the manner in which nature intended. The hoof mechanism in its natural state is designed to be a shock absorber as well as a vital aid to the circulatory system. When in motion, on contact with the ground surface, the digital cushion is compressed between the pastern bone and the sensitive frog and redirects the remainder of the force outwards and upwards to the lateral cartilages (attached to the sides of the coffin bone). The foot will expand and the sole will widen, this expansion absorbs shock and also permits the coffin bone to lower which in turn brings blood flow to the area. As the foot is lifted in stride it contracts forcing the blood out of the foot and up the leg as the foot hits the ground on the next stride. Not only does the entire structure of the foot benefit from increased circulation this process is fundamental for the health and well being of the horse.

Domesticated horses are not so lucky. They are exposed to much less uneven terrain and spend a great deal more time confined to stalls where movement is prohibited as the average stall is 11'×11'. They are protected from the more harsh and abrasive aspects of nature. Furthermore, special feeds which create other desirable conditions in domesticated horses may have a harmful effect on the feet. Therefore, it has long been recognized that special care is required to maintain domesticated horses' feet in proper condition. Horseshoes are used for this purpose.

Traditionally over the years most domesticated horses have been and are currently shod with shoes made of metal such as steel or aluminum alloys. Horseshoes are typically secured to hooves by nails. The nails pass through holes in a horseshoe and are driven into the horn wall of the hoof, known as the keratinous portion of the hoof. Great care must be taken in directing the nail into the keratinous portion so as to prevent injury to the horse. The nails are driven at an angle away from the center of the hoof, the nail points extend through the outer side wall of the hoof where they are cut off and clinched or hammered against the hoof.

Aluminum alloys are most commonly used today in racing and are characterized by efficient application, relatively low weight and expense. Horses engaged in competition training or racing are commonly re shod every three to six weeks depending on the individual's hoof growth. This is done in consideration of the weakened clinches (nails), but primarily by the desire to maintain healthy geometry with respect to the configuration of the foot and so facilitate optimal biomechanics, or way of going. As a result of the natural flexion and movement of the foot over time the nails work loose and the clinches become raised, which can often lead to a horse dislodging a shoe or shoes. This event can result in damage to the hoof wall when the clinched nails are pulled through the wall of the hoof or more disastrous if the shoe is not pulled off cleanly the horse may step on exposed nail ends damaging the sole or frog or further damage a leg with the dislodged shoe.

Frequent removal and reattachment of shoes makes numerous nail holes in the hoof walls. There is always a possibility of error when driving a nail, if driven too close to the white line it can be very painful for a horse leading to lameness and possibly abscesses. If there is insufficient new healthy horn growth two problems arise. First, with numerous nail holes already in the hoof wall, it can be difficult or sometimes impossible to secure a new shoe. Second, the abundance of nail holes lets in bacteria, dries out the hoof wall, damages the corium (vascular tissue that supplies nourishment to the hoof) and generally weakens the hoof structure, which can lead to failure of the wall and damage to the horse's hoof and foot. Thus, the well known phrase, no foot no horse, prevails.

The surfaces on which horses train and perform vary widely. Horses frequently train and compete on grass, dirt, sand, cinder, crushed stone, and sometimes on packed surfaces which nearly approach the hardness of asphalt or cement. The hardness of the training or racing surfaces can greatly increase the effective rate of loading, thus the shock and vibration, e.g., the peak g forces which the horse will experience. The shock and vibration transmitted to a horse's anatomy is intensified by metal shoes and can directly affect a horse's efficiency, athletic performance and the amount of trauma that will be experienced.

Accordingly, it can be readily understood that the potential for injury is large whenever horses train or race on hard surfaces. Horses are best trained by placing them into open paddocks and training them on forgiving yet not unstable natural surfaces. Clearly, no single factor can so greatly affect the level of stress being placed upon a horse, as can the training or racing surface and overall training program. In Thoroughbred or Standardbred racing trainers have very few alternatives, for their horses, to the racetrack for daily training.

It is known that the foot of an active unshod horse living in a natural environment will wear such that the front and back of the hoof become gently rounded. In fact, horseshoes which are initially substantially rectangular in cross-section will wear in these areas and eventually enable the combination of a horse's foot and horseshoe to assume a somewhat similar shape. Unfortunately, many conventional horseshoes are so constructed as to require replacement by the time this more natural configuration is attained. It is also known that the hoof of an active unshod horse living in a natural environment will assume a slightly concave shape in the toe area between the medial and lateral sides, as when viewed from the front, but also along both sides of the hoof between the toe and heel. This configuration permits the hoof to better slide or plane over the ground support surface during the braking phase as impact takes place, thereby reducing the effective rate of loading and the shock and vibration experienced. Further, this configuration also permits the hoof to better grab the surface during the later propulsive phase, and to break over and make a faster transition during toe-off, thus enhancing stride frequency and exhibited speed. The ability of the horse's hoof to slide somewhat can also enhance stability relative to a situation in which a horse's foot would suddenly catch or grab the ground support surface, as can happen with the use of horseshoes having rectangular configurations which possibly further include toe grabs, raised traction members or cleats. Of course, the presence of extremely loose or slippery ground can neutralize the possible adverse effects of such traction devices, and in fact, such may provide better performance and safety in such circumstances.

As explained formerly, it is known that in the unshod natural state, a horse's foot and hoof will flex and slightly widen when under load forces.

The use of relatively rigid metal or aluminum horseshoes substantially prevents this natural movement and so tends to reduce both the effective size, and the shock and vibration absorbing capability of a horse's foot. A steel horseshoe is known to be more forgiving in this regard than an aluminum horseshoe. It is believed that the occurrence of hoof cracks is sometimes caused by the flexing and widening action of the foot and hoof working against the nails associated with a substantially inflexible horseshoe. The natural wearing of the hoof is also prevented by the inflexible horseshoe which can result in contraction and inflammation of the foot.

Non-metallic materials such as plastic or rubber are sometimes used in combination with a metal horseshoe and such hybrid products are generally referred to in the industry as bonded horseshoes.

Plastic and rubber materials have been chemically and/or mechanically bonded to metal shoes to create various configurations, e.g., these materials have been used between upper and lower metal layers of a horseshoe, between the horseshoe and the hoof, on the ground engaging portion of a horseshoe, and to completely encapsulate a metal horseshoe.

Although some shock or vibration may be relieved through these alternatives, the rigidity of the metal shoe is still present as is the damaging effect of the nails.

Horseshoes made of a plastic material are known. Most, if not all, plastics horseshoes currently on the market suffer from the disadvantage that they are time-consuming and awkward to apply, particularly those that have to be assembled from a kit of parts or require special equipment. The composition of plastics horseshoes varies widely with some being as restrictive as a metal horseshoe. Some inventions teach methods where a person without farrier skills can attach the hoof covering. An equine hoof requires particular preparation prior to shoe application, with unknowledgeable trimming or rasping and handling of some equipment, disastrous results can be realized. Most Thoroughbred horses, especially those in intensive training programs can easily hurt someone not skilled in the art.

Some glue on horseshoes currently on the market attaches the shoe by use of side extensions such as tabs or fabric cuffs which extend up the sidewall of the hoof.

Gluing to a sidewall presents special problems, principally because bonds there can be subjected to very high tensile forces when a horse pivots, and bonds are usually weakest in tension. In addition, for horses with thin hoof walls, such as many Thoroughbreds have, when gluing side extensions the high heat (hoof adhesives heat up significantly when curing) can produce discomfort for the horse. The hoof wall is almost encapsulated by these extensions and adhesive creating unnatural conditions which can be detrimental to the health of the horse's foot.

It is time consuming to fit such a shoe, wasteful of material, and requires a number of parts to be supplied for each shoe. For the next shoeing, the tabs can prove extremely difficult to remove from the upper hoof wall, causing discomfort for the horse and extra time spent prepping the hoof for the fitting of new shoes.

Prior art has not recognized a product made from a plastics material which is widely accepted by trainers of performance horses. The foregoing illustrates limitations known to exist in present horseshoes. Thus, it is apparent that it would be advantageous to provide an alternative directed to overcoming the limitations set forth above.

The present invention offers a solution where prior art has failed. Two of the foremost problems are addressed, the eradication of a rigid shoe and nails as the form of attachment.

Hence, the present invention teaches a novel configuration for a preferred horseshoe which conforms to the foot imitating the known configuration which healthy, active, unshod horses acquire when living in a natural environment. Further, the present invention teaches a preferred horseshoe with a degree of hardness closely resembling the natural composition of the equine hoof which permits natural flexing and widening of the foot and horseshoe when under load forces.

Accordingly, several objects and advantages of my invention are as follows:

A significant reduction of trauma and stress subjected to the horse's skeletal and muscular system when under load forces.

An improved circulatory system thus enhanced performance and health of the horse.

Due to the characteristics of the present invention a self leveling effect is achieved. As new horn is regenerated over the course of a few weeks the present invention gradually wears, resulting in a longer period of optimal biomechanics before the next shoeing. The heels are allowed to drop naturally as they grow avoiding the jammed up effect which can often lead to quarter cracks.

Another objective of the present invention is to provide an improved method of attaching a horseshoe using adhesives. The elimination of nails promotes stronger, healthier horn regeneration and removes the element of error when driving nails.

It is still another object of the present invention to considerably reduce the occurrence of diseases and detrimental conditions of the foot, e.g. laminitis, navicular syndrome, white line disease and quarter cracks.

It is yet another object of the present invention to provide a horseshoe that can be easily and efficiently attached or removed by a farrier in the field. The preferred horseshoe can be cut, rasped, sanded or ground down using regular farrier tools.

The present invention also seeks to provide a horseshoe that can easily be fitted to a foot having a given shape and width by cold forming without the need for special equipment. The simplicity and streamline nature of the present invention gives it a further advantage over prior art which is bulky and obtrusive.

It is still a further object to provide such a horseshoe which guards against dislodgment regardless of the direction of frictional force on the shoe relative to the hoof.

In field testing the present invention and method of attachment has proven its strength and resilience by 6 weeks of continued attachment on a Thoroughbred racehorse in an intensive training program. Further field testing has produced winners on racing surfaces, dirt and turf.

It is still a further object of the present invention to provide a horseshoe that is light in weight and comfortable to a horse.

These and other objects and advantages of my invention will become apparent from a consideration of the drawings and ensuing description.

SUMMARY

The technology of the present invention provides a protective barrier for the equine hoof wall to ground surface interface and simultaneously allows an equine foot to function as if it was barefoot.

The natural spreading and circulation pumping action of the equine hoof when in motion is not facilitated by prior art horseshoes. An existing need remains in the art for a horseshoe that interferes as little as possible with the natural mechanical functioning of the horse's foot, and should not exert on the muscles and tendons thereof any strain, pressure or other unnatural force to which the horse is unaccustomed.

The present invention satisfies the aforesaid needs with a preferred horseshoe that allows the equine hoof mechanism to function without limitation when under load forces, thus flexing and widening, the equine foot is encouraged to be as nature intended permitting the hoof to grow and wear without restriction.

Intended to benefit most are horses under highly stressed conditions of competition on the racetrack, exhibition arena or polo field however the scope of the present invention could be a great deal wider where horses require an alternative to the rigidity of metallic shoes, e.g., horses performing on stage in the entertainment world, stallions when covering a mare in the breeding shed, or young horses that require custom made configurations to manage angular deformities etc.

The principal object of the present invention is to provide protection for a horse's feet without interference to the natural anatomical functioning of the horse's leg or hoof and therefore permit the horse to perform as if they were not wearing shoes at all.

DRAWINGS

DETAILED DESCRIPTION

The present invention teaches a novel design for a preferred horseshoe that closely resembles the natural composition of the equine hoof which conforms to the foot, imitating the known configuration which healthy, active, unshod horses acquire when living in a natural environment.

Figure 1:
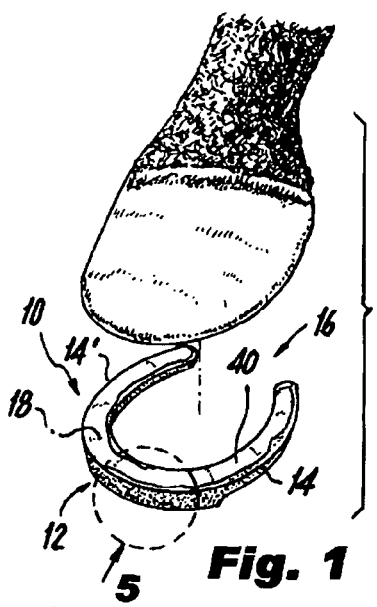
FIG. 1 is an exploded perspective view of the preferred embodiment of the horseshoe to be adhesively attached to a horse's hoof.

FIG. 1 shows a shoe, or horseshoe 10 in accordance with one embodiment of the present invention, in spaced relation to the underside of a horse's hoof. The horseshoe 10 is molded in a traditional C-shape with an open heel. For orientation purposes, the shoe provides a toe portion 12, or anterior segment, left side portion 14, right side portion 14' and heel portions 16, or caudal segments. In practice, it is preferred that portion 14 and 14' be molded or formed as mirror images in terms of shape and surface contour. On an animal to be shod, the toe portion 12 is the segment of the shoe toward the anterior, or front, and the heel portions 16 are the segments of the shoe toward the caudal, or rear, of the animal. Although described here as segments, these are integrally formed as one piece, and the terms are used to describe their general location in relation to the hoof of a horse.

Referring again to FIG. 1, horseshoe 10 has a top 18, or hoof contact surface, which receives a coating of adhesive 40 prior to placement on the sole of the hoof. In practice, it is desirable that hoof contact surface 18 be roughened or otherwise textured, so as to insure a good bond with the adhesive 40 and the sole of the hoof. A typical hoof contact surface 18 is level, and tapers at the end of the heel portions 16.

Figure 3:
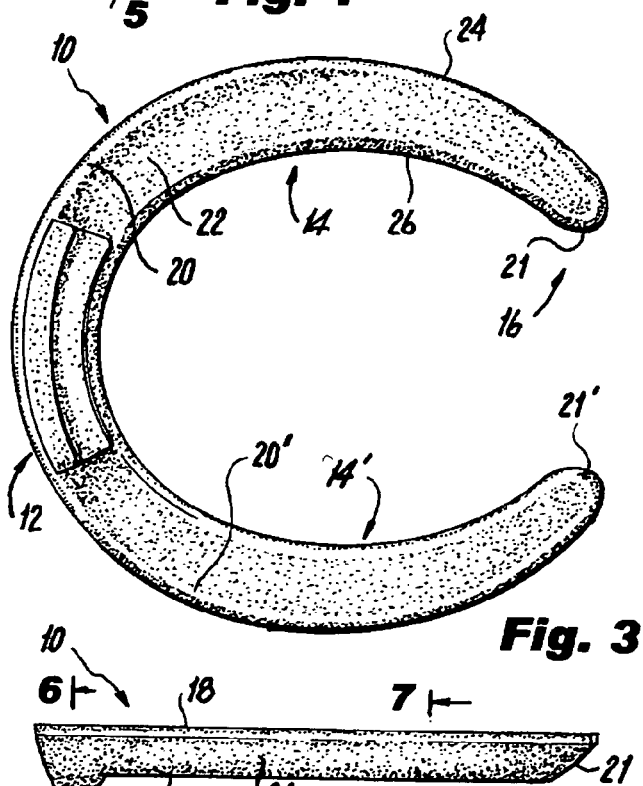
FIG. 3 is an underside plan view of the horseshoe.
Figure 4:
FIG. 4 is a side elevation of the horseshoe.
Figure 7:
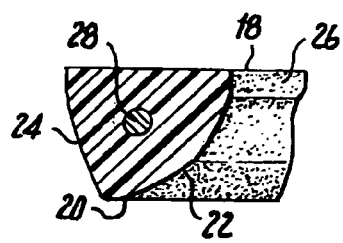
FIG. 7 is a sectional end view elevation taken at 7-7 of FIG. 4, showing the surface contour and exposed wire of the horseshoe.

Turning now to FIG. 3, the underside of shoe 10 is illustrated. A base 20 and 20', or ungulate surface, which is the terrain-contacting surface, is formed about the arcuate periphery of side portions 14 and 14' through the toe portion 12 ending at the heel portions 16. As seen in FIG. 3 and FIG. 4, the base 20 and 20' terminates in smoothly tapered faces 21 and 21', at heel portions 16. In practice, the base 20 and 20' is formed level so as to insure good contact with any typically encountered terrain. As seen in FIGS. 3 and 4, shoe 10 is formed with an inwardly tapering, arcuately formed outer edge 24, and inner edge 26. As best seen in FIG. 7, which is a sectional elevation taken through left side portion 14, a beveled 22, or chamfered surface, forms a transition between the outer edge 24 of the base 20 and inner edge 26. This beveled 22 form can be optionally formed as a flat surface, or with a slight "belly" as seen in FIG. 7.

During the lifespan of the shoe 10, the width of the base 20 will increase as a result of frictional terrain contact, as beveled surface 22 is ground down (shown in FIG. 13 and discussed later). This "wearing" of the shoe is desirable, as the material forming the shoe absorbs the impact and does not transfer the stress to the horse's musculature.

Figure 2:
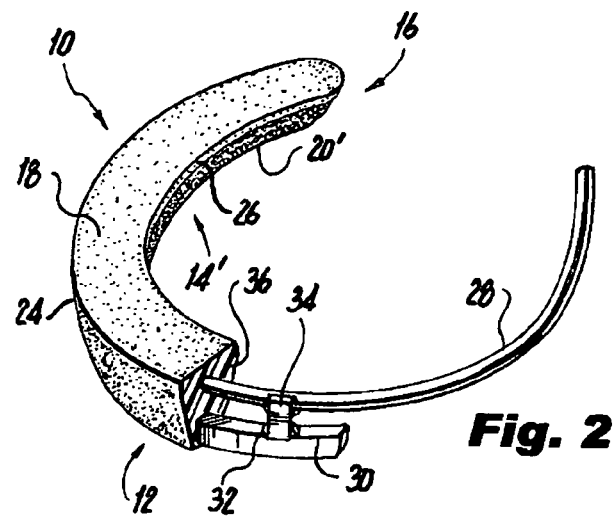
FIG. 2 is a top perspective view of the horseshoe of FIG. 1 with the polymeric material removed from one side to expose half the hard wear resistant insert and wire.

Turning now to FIG. 2 a portion of the internal structure of the horseshoe 10 according to one preferred embodiment of the present invention is revealed. In a typical embodiment, the shoe is molded of a polymeric material 36, and preferably hybrid polyurethane. A pliant wire 28, or reinforcer which may be made from metal such as, steel, aluminum alloys, stainless steel and the like, which can be formed and retain a C shape, or arc, is embedded within the horseshoe 10, or it can be totally encapsulated. The wire 28 is preferably formed of a single rod of material, which is then encased within the polymeric material 36 of the shoe, as seen in FIG. 2. The encapsulated wire 28 preferably has a thickness of approximately $\frac{1}{8}$", but the size is predetermined by one skilled in the art of a farrier. To reinforce the toe portion 12 of the shoe, which contacts the ground surface, the invention includes a hard wear resistant insert 30, or hardened reinforcer, preferably made from metal such as steel or another hardened material.

When a metal is used for the reinforcers, one preferred embodiment is a magnetizable metal, which is considered therapeutic by those skilled in equine science.

Figure 5:
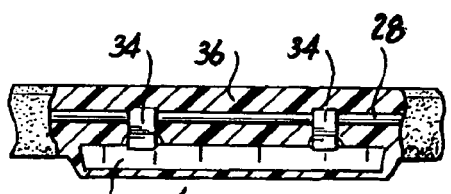
FIG. 5 is a front elevation of the horseshoe taken at arrow 5 of FIG. 1, showing the polymeric material removed to expose the hard wear resistant insert.
Figure 6:
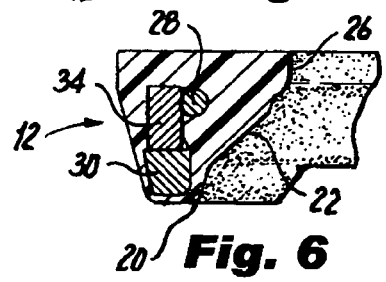
FIG. 6 is a sectional side elevation taken at 6-6 of FIG. 4, showing the hard wear resistant insert with prong extensions and wire exposed.

As shown in FIG. 5, the toe portion 12, the hard wear resistant insert 30 when made of steel is attached to the wire 28 by at least two prong extensions 34. Typically, spot welding, as at 32, is employed to join the hard wear resistant insert 30, prong extensions 34 and wire 28, although other fabrication processes could be contemplated. The hard wear resistant insert 30 preferably is approximately 2½" in length, ¼" in width, with prong extensions 34 of approximately ¼" and the insert preferably is almost completely encapsulated within the moldable polymeric material 36, as seen in FIGS. 5 and 6. It should be noted that polymeric material 36 forms a thin wall around hard wear resistant insert 30; this wall wears away quickly subsequent to installation on the hoof, exposing the hard wear resistant insert 30.

In other embodiments, the hard wear insert is fitted to the anterior segment of the shoe by means other than welding, such as being co-molded with the entire shoe, bonded chemically or by polymeric bonds, joined with mechanical fasteners.

Figure 8:
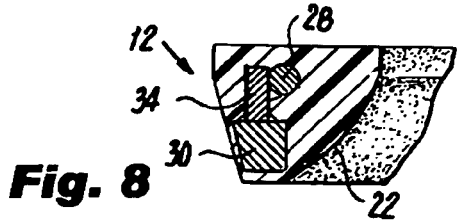
FIG. 8 is a sectional elevation of an alternate toe portion embodiment, with hard wear resistant insert completely encased within the polymeric material.
Figure 9:
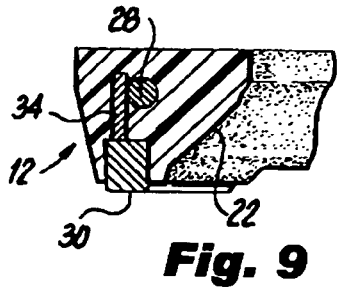
FIG. 9 is still another alternate toe portion embodiment in which the hard wear resistant insert protrudes from the polymeric material.

Two alternate embodiments are shown for toe portion 12 in FIGS. 8 and 9. FIG. 8 discloses a profile in which hard wear resistant insert 30 does not depend from the underside of the shoe. FIG. 9 illustrates a hard wear resistant insert 30 which depends from the shoe and is not completely encased within the polymeric material 36.

The moldable shoe generally is molded integrally, in one piece, and is an open ellipse shape. That ellipse is closed from the caudal end portions, through the side segments and the anterior segment, and is open between the two caudal ends. The shoe is flexile, because of the moldable composition and the pliant metal reinforcer, such that the shoe can be conformed to the shape of a horse's hoof. The pliant metal embedded or encapsulated in the shoe enables the farrier to bend it to conform to the circumferential edge of the hoof. That pliant metal reinforcer preferably is joined to the second reinforcer, or hard wear insert, which is fitted to the anterior segment or toe portion of the shoe. The shoe has a contact surface that is joined to the hoof by adhesives, selected by skilled farriers. The opposite side of the shoe is the ungulate surface, which has the inventive quality of performing like an unshod hoof. The ungulate surface preferably has a sidewall, a crowned edge and an inner wall. The sidewall starts along the outer arc of the ellipse-shaped segments. The sidewall of many conventional metal horseshoes is vertical from the hoof to the ground. The preferable sidewall of the present invention is not vertical, but is chamfered or beveled in toward the inner arc of the ellipse-shaped segments. The chamfered sidewall, crowned edge and tapering inner wall of one preferred embodiment perform, wear and flex in a way comparable to an unshod hoof.

The preferred horseshoe 10 is molded from polymeric material 36 to form a moldable shoe that is flexile. Polymeric material 36 is available in a vast range of durometer hardness, and flexural qualities. The present invention's durometer on the Shore D scale preferably ranges from 60 to 70 from the Hapflex 600 series device, produced by Hapco Inc. Hanover, Mass.

Physical Properties:

|  |  | 661 | 666 | 671 |
|---|---|---|---|---|
| Hardness Shore |  | 60D | 65D | 70D |
| Tensile Strength (psi) |  | 2400 | 3300 | 4200 |
| Tear Strength (pli) |  | 420 | 450 | 660 |
| Modulus of Elasticity (psi) 000 |  | 20 | 25 | 60 |
| Heat Distortion |  |  |  |  |
| Temp. (° C.) | 66 psi | 122° C. | 110° C. | 133° C. |
|  | 264 psi | 62° C. | 71° C. | 124° C. |
| Flexural Strength (psi) |  | 1660 | 2700 | 3710 |
| Flexural Modulus (psi) 000 |  | 24.6 | 41 | 57 |

Figure 10:
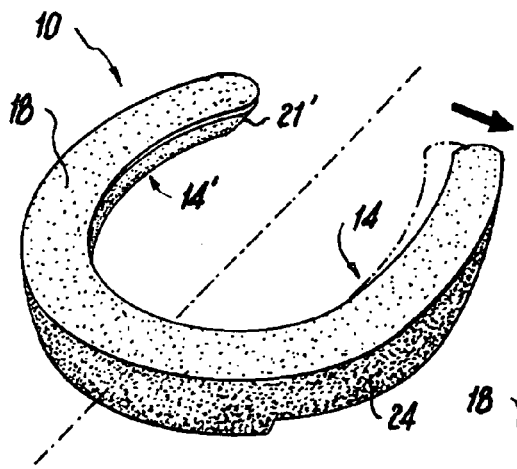
FIG. 10 is a perspective view of the horseshoe showing width-wise bending of the side and heel portion.
Figure 11:
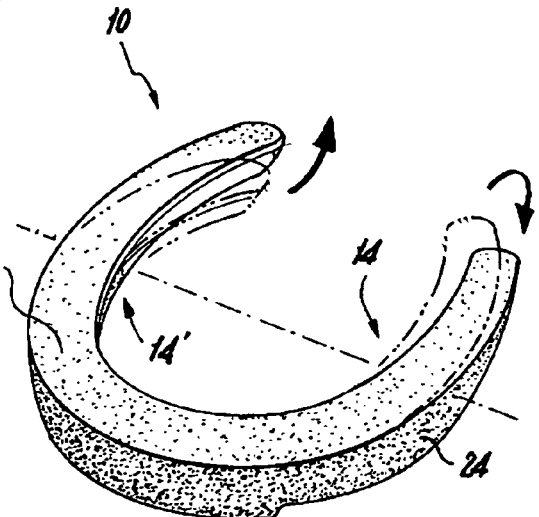
FIG. 11 is similar to FIG. 10, however illustrates the racking ability of the side and heel portions of the horseshoe.

As seen in FIGS. 10 and 11, the durometer of polymeric material 36 forming the preferred embodiment allows for flexing and bending of side portions 14 and 14'. This bending or "racking" of the shoe is advantageous for custom fitting of the shoe during installation on a hoof. In particular, racking is illustrated in FIG. 11, where the side portions are stressed in opposing directions about the longitudinal centerline. This flexibility and durability may be required while traversing a rugged trail, in which the horse's hoof is subjected to awkward hoof strikes on rocks, crevices and debris. The ability to flex increases the shoe's durability, as well as mitigating the stress applied to the horse's hoof, ankle and leg.

Figure 12:
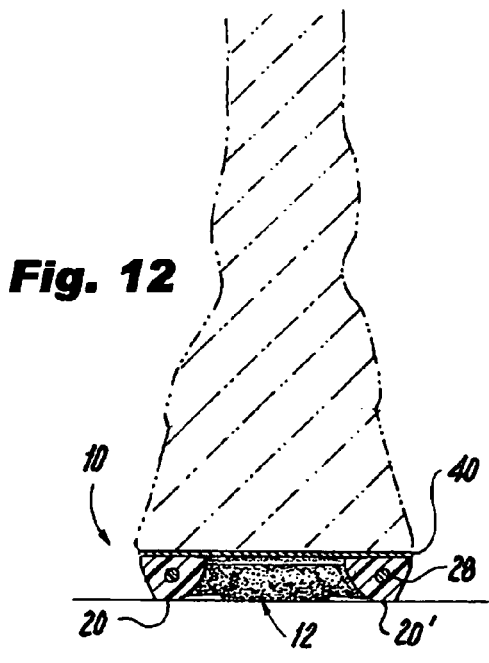
FIG. 12 is a diagrammatic sectional elevation of the preferred embodiment of the horseshoe adhered to a horse's hoof.
Figure 13:
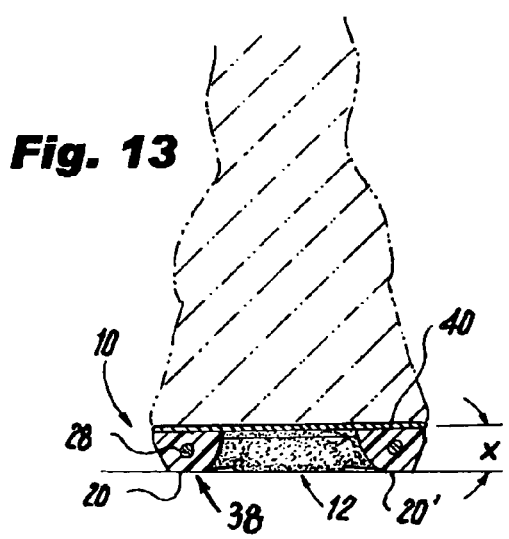
FIG. 13 is a diagrammatic sectional elevation of the preferred embodiment, showing uneven wear of the polymeric material as a result of a horse's uneven gait or angular deformities.

FIGS. 12 and 13 are diagrammatic sectional elevations of shoe 10, as viewed from the heel portions 16. FIG. 12 shows a new shoe 10 installed with an adhesive 40 layer to a horse's hoof. It is appreciated that the base 20 and 20' is intact, as is toe portion 12. FIG. 13 illustrates shoe 10 as worn by a horse suffering from an uneven gait or angular deformities. It will be appreciated that the base 20 has been worn down as at 38, the result of compensating for the horse's uneven load forces upon the hoof. The shoed portion of the hoof which takes the greatest measure of ground contact will wear down comparably to that of an unshod hoof. In addition to the uneven load forces the equine hoof wall may have varying growth rates, the shoe 10 adapts to this uneven growth by wearing therefore the hoof is permitted to strike naturally, as indicated at an angle denoted by "x". The flexile material does not bind the hoof as does a metal shoe. Unlike prior art, which typically causes discomfort during an uneven hoof strike, shoe 10 allows for the uneven hoof strike and provides both comfort and shock absorption.

Figure 14:
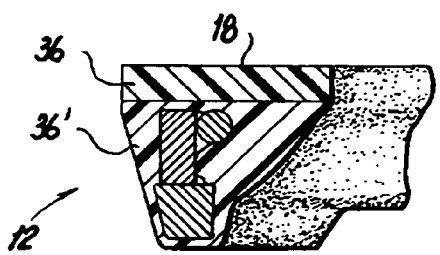
FIG. 14 is a sectional elevation of an alternate toe portion embodiment, illustrating dual layers of polymeric material with differing durometers.

The horseshoe 10 according to the present invention is molded from polymeric material 36 with a uniform durometer of hardness. Alternatively, as depicted in FIG. 14 alternate layering of polymeric material 36 with different durometer of hardness in the molding step could be beneficial for some animals or for varied ground conditions. As illustrated in FIG. 14, toe portion 12 is formed with a polymeric material 36 of a durometer for comfort adjacent the hoof, while material 36' is selected for durability and wear-resistance due to its harder durometer. Persons skilled in the art will rely on their experience to select a moldable composition that provides useful levels of flexibility, wear and resiliency, and to select a reinforcer wire that is sufficiently pliant that adequately holds the desired shape, and to select a hard wear insert material for the horse and the ground conditions. All of these are within the level of skill of an experienced farrier.

Process of Manufacture

The wire 28 is shaped and cut from bar stock to the C shape of the preferred horseshoe 10 which varies in sizes. The wire 28 length is adjusted to fit inside the mold allowing for approximately ½" where the side portions 14 and 14' preferably taper to faces 21 and 21' at the heel portions 16. The toe portion 12 of the wire 28 is attached by spot welds 32 to the prong extensions 34 of the hard wear resistant insert 30. Fabricating the wire 28 and hard wear resistant insert 30 in one piece is an alternative. Another embodiment is spot weld 32 to prong extensions 34 where the hard wear resistant insert 30 would be flush with the base 20 of the horseshoe 10, as shown in FIG. 8, or to spot weld 32 to prong extensions 34 resulting in the hard wear resistant insert 30 projecting out from the polymeric material 36, as shown in FIG. 9.

A mold of the preferred horseshoe 10 is sprayed with a suitable release agent, such as, Grease-It Four, Hapco Inc. The wire 28 with attached hard wear resistant insert 30 is set inside the mold with the ends of the wire 28 suspended by fine line made of plastic, nylon or like material across the heel portions 16, or by using magnets to hold the wire 28 in place or by other means to maintain the wire's 28 position in the core of the mold. An alternate embodiment, when using a magnet to maintain the wire's 28 position in the core of the mold, is to place and secure the magnet on top of the wire 28 allowing the polymeric material 36 to encapsulate it to become part of the horseshoe 10. This alternate embodiment would magnetize the horseshoe 10 providing magnetic therapy to the hoof wall when fitted.

The polymeric material 36 is mixed to a moldable form, in accordance with the chosen product's ratio formula, preferably to a low viscosity, making it easy to handle and pour. Gel time is approximately 30 minutes with a demold time of 24 hours, which is the time to reach 80% of cure. Size, mass and temperature effects gel and demold time. For a full cure, some may prefer to allow 7-10 days. Demold and final cure time can be accelerated with the addition of heat. The mold defines the segments of the shoe, and the shape of the preferred ungulate surface, as described above. When the mold is filled, the composition reaches a level naturally, which forms the generally planar, hoof contact surface. Once full cure is reached the preferred horseshoe 10 is prepared for attachment. To achieve a surface that bonds well with adhesive 40 the top 18, or hoof contact surface of the preferred horseshoe 10 is sanded to attain a rough appearance and feel as opposed to a smooth, glossy finish realized straight from the mold.

Method of Attachment

The design of the preferred horseshoe 10 is such that it is attached to the hoof by adhesive 40. In the preferred embodiment, the shoe has no nail holes or attachment tabs, and is designed to be adhered to the hoof by adhesive between the contact surface of the shoe and the hoof. Through field testing much success has been achieved by using Equilox, Vettec or Grand Circuit Hoof Adhesive, which are among several products on the market for bonding horseshoes to the hoof. The properties of these adhesives allow the preferred horseshoe 10 to flex and widen without weakening the bond between the horseshoe and hoof.

After the hoof is prepared (trimmed and rasped) and the preferred horseshoe 10 custom fitted, a degreasing agent such as acetone is applied to the perimeter of the sole where the adhesive 40 shall be applied. It is important to have a clean, greaseless surface to achieve a good bond. Alternatively, the contact surface may be roughened so as to accept adhesive and form a bond. A protective foot covering can be used to keep the hoof clean whilst the adhesive 40 is prepared. Hoof adhesive 40 is applied to the top 18, or hoof contact surface of the preferred horseshoe 10. Alternatively, adhesive can be applied to the perimeter of the sole of the foot, with care being taken not to apply the product in excess. Any excess adhesive 40 can be removed and added to the heel area where required. In some cases where a horse's hoof is weakened from previous nail holes or past ailments this is an appropriate time to patch the area with hoof adhesive 40 during or after fitting the preferred horseshoe 10. The cure time of the hoof adhesive 40 gives a farrier time to set the preferred horseshoe 10 in place and adjust its position if necessary before setting. Cure times vary with environment conditions and products. They range between 2-4 minutes in warm temperatures up to 7 minutes in cold temperatures. Several products on the market have faster cure times than others.

Once the preferred horseshoe 10 is set in place and the hoof adhesive 40 has cured any excess adhesive 40 on the sole, outside of the hoof wall or around the heel area is removed by rasping or use of a sanding tool resulting in a streamline uninhibited foot. The hoof adhesive 40 once cured is comparable to the composition of the hoof wall.

When the horse is due to be shod again the preferred horseshoe 10 is simply trimmed off using farrier's nippers just as if it was hoof wall.

Operation of Invention

The simplicity of the present invention is one of the advantages over prior art. It is devised to be part of the horse's own hoof and function as one, expanding and contracting in the identical direction.

The hoof mechanism in its natural state is designed to be a shock absorber as well as a vital aid to the circulatory system. When a horse is in motion, on contact with the ground surface the weight of the horse compresses the digital cushion between the pastern bone and the sensitive frog and redirects the remainder of the force outwards and upwards to the lateral cartilages (attached to the sides of the coffin bone). The foot expands and widens when under load forces as does the polymeric material 36.

As the foot is lifted in stride the digital cushion expands and the foot contracts, as does the polymeric material 36, forcing the blood out of the foot and up the leg. The polymeric material 36 is designed to wear 38 unlike the deliberations of prior art horseshoes. This characteristic is enhanced by the base 20 of the preferred horseshoe 10. As the base 20 is beveled 22 from the outside edge 24 of the preferred horseshoe 10 to the inside edge 26 it shall wear 38 more rapidly when subjected to additional force, this wear will slow as the beveled 22 edge becomes worn and thus wider. For example when a horse's foot hits the ground it may not set it down evenly due to bad confirmation or gait. (Many horses do not have perfect confirmation or way of going.) If more weight is distributed on one heel over a period of time the base 20 of the preferred horseshoe 10 shall wear 38 down more in this area having the effect of self leveling which in turn prevents the horse's heel becoming jammed up leading to pain and inflammation in the foot. This concave shape of the preferred horseshoe 10 imitates the known configuration which healthy, active, unshod horses acquire when living in a natural environment.

The wire 28 which is encapsulated within the preferred horseshoe 10 does not restrict its flexing and widening capabilities. The wire 28 has two novel and primary purposes. First, is to enable shaping of the horseshoe 10 by a farrier in the field for an individual horse, when the horseshoe 10 is custom formed by hand (pressure applied to widen or reduce the width) the wire 28 retains the shape without the need of special equipment making the procedure quick and efficient. The polymeric material 36 of the preferred horseshoe 10 can simply be cut, sanded or rasped if necessary. Second, is to give the hard wear resistant insert 30 a means of attachment and reinforcement within the polymeric material 36.

The hard wear resistant insert 30 which is attached to the wire 28 gives reinforcement to the toe portion 12 of the preferred horseshoe 10. As this area of the preferred horseshoe 10 is subjected to the most abrasion especially over unnatural surfaces, e.g., tarmac and concrete, the hard wear resistant insert 30 prevents the preferred horseshoe 10 in this area wearing too rapidly, thus extending the time between shoeing.

As will be evident to persons skilled in the art, the foregoing detailed description and figures are presented as examples of the preferred embodiments of the invention, and that variations are contemplated that do not depart from the fair scope of the teachings and descriptions set forth in this disclosure. The foregoing is not intended to limit what has been invented, except to the extent that the following claims so limit that.

I claim:

1. A moldable shoe for contacting a support footing, comprising:
   an anterior segment, caudal end portions, and side segments, which are integrally formed, and said shoe having an ungulate surface and a contact surface,
   wherein said anterior segment and side segments shaped as an ellipse that is open between the ends of said caudal portions to form an open heel and a C-shaped recess between and separating the side segments, which open heel and C-shaped recess includes said caudal end portions,
   wherein said shoe formed of moldable composition, which forms a resilient, flexile material,
   wherein said ungulate surface is crowned, said contact surface is planar and both said surfaces are configured from the resilient, flexible material, and
   wherein said shoe having a first reinforcer and a second reinforcer, said first reinforcer being a pliable, metal rod-like reinforcer, embedded and encased entirely within said moldable composition, and said second reinforcer being a hardened wear insert, embedded and encased substantially entirely within said moldable composition at said anterior segment, which second reinforcer is separated from but fixedly attached to and thereby made integral with a portion of said first reinforcer positioned at said anterior segment and which is constructed to extend from its location of fixed attachment vertically upward to said crowned ungulate surface to realize inherent flexibility and enhanced wear resistance; wherein said second reinforcer comprises a hardened metal, and wherein said hardened metal is fixedly attached within said anterior segment to said first reinforcer utilizing at least two hardened metal prong extensions; and wherein said second reinforcer extends horizontally for a fixed length in said anterior segment and wherein said at least two hardened metal prong extensions operate to vertically set off said horizontal length of said second reinforcer in a horizontal plane that is separate and distinct from a horizontal plane within which said portion of said first reinforcer within said anterior segment is disposed.

2. The shoe of claim 1, wherein said anterior segment, said caudal segments, and said side segments are integrally formed of said resilient, flexible material.

3. The shoe of claim 1, wherein said ungulate surface has a side wall formed along the outer edge of said ellipse shaped segments and said side wall extending to said crowned portion, and said ungulate surface tapering from said crowned portion down to an inner edge of said ellipse shaped segments.

4. The shoe of claim 3, wherein said ungulate surface, is defined in cross-section, by said side wall being chamfered from said outer edge inward.

5. The shoe of claim 1, wherein said contact surface is roughened to accept a layer of adhesive to join said contact surface to a horse's hoof.

6. The shoe of claim 1, wherein said first reinforcer extends through said anterior segment and said side segments, terminating near said ends of said caudal segments.

7. The shoe of claim 1, wherein said second reinforcer is a band with prong extensions for being welded to said first reinforcer.

8. The moldable shoe of claim 1, with said moldable composition comprising a hybrid polyurethane.

9. The shoe of claim 1, wherein a substantially continuous volume exists between said fixed length of said second reinforcer vertically set off from said portion of said first reinforcer in said anterior segment, which substantially continuous volume comprises resilient, flexile material.

10. The shoe of claim 9, wherein said substantially continuous volume prevents debris that could enter through a wear opening in said crowned ungulate surface at a vertical edge of said second reinforcer from migrating through to said portion of said first reinforcer within said anterior segment.

11. The shoe of claim 1, wherein said pliable, metal rod-like first reinforcer comprises wire.

12. The shoe of claim 1, wherein said pliable, metal rod-like first reinforcer extends continuously in a horizontal plane within said resilient, flexile material along substantially an entire length of said shoe.

13. The shoe of claim 1, wherein said pliable, metal rod-like first reinforcer cooperates with said moldable composition formed of said resilient, flexile material in order to allow an overall shape of said shoe to conform to a shape of a hoof to which said shoe is to be attached.

14. The shoe of claim 1, wherein said pliable, metal rod-like first reinforcer is configured within said moldable composition formed of said resilient, flexible material operates to allow for fixing a set distance between said side segments and caudal end portions to accommodate a width of a hoof to which said shoe is to be attached, whereinafter said fixed distance readily expands and contracts with a natural expansion and contraction of side segments and caudal end portions of the hoof.

* * * * *